(12) United States Patent
Kim et al.

(10) Patent No.: US 9,547,919 B2
(45) Date of Patent: Jan. 17, 2017

(54) DISPLAY APPARATUS AND CONTROL METHOD THEREOF

(71) Applicant: SAMSUNG ELECTRONICS CO., LTD., Suwon-si (KR)

(72) Inventors: Dae-sik Kim, Hwaseong-si (KR); Dong-yeob Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 14/547,364

(22) Filed: Nov. 19, 2014

(65) Prior Publication Data

US 2015/0371407 A1 Dec. 24, 2015

(30) Foreign Application Priority Data

Jun. 23, 2014 (KR) .................. 10-2014-0076390

(51) Int. Cl.
| | |
|---|---|
| H04N 1/04 | (2006.01) |
| G06T 11/00 | (2006.01) |
| G06T 11/40 | (2006.01) |
| G06K 9/20 | (2006.01) |
| G06K 9/22 | (2006.01) |
| H04N 1/00 | (2006.01) |
| G06F 1/16 | (2006.01) |
| G06F 3/0484 | (2013.01) |

(52) U.S. Cl.
CPC ............. *G06T 11/00* (2013.01); *G06F 1/1686* (2013.01); *G06F 3/04847* (2013.01); *G06K 9/209* (2013.01); *G06K 9/22* (2013.01); *G06T 11/40* (2013.01); *H04N 1/00* (2013.01); *G06K 2209/01* (2013.01)

(58) Field of Classification Search
USPC .......................................... 358/474
See application file for complete search history.

(56) References Cited

U.S. PATENT DOCUMENTS

| | | | | |
|---|---|---|---|---|
| 5,754,713 | A * | 5/1998 | Deguchi .............. | H04N 1/1013 358/452 |
| 5,778,276 | A * | 7/1998 | Hasegawa .......... | G03G 15/5025 355/75 |
| 6,097,834 | A * | 8/2000 | Krouse ................. | G06Q 20/04 382/137 |
| 6,327,503 | B1 * | 12/2001 | Familoni ............ | A61N 1/36007 607/40 |
| 2004/0184115 | A1 * | 9/2004 | Suzuki ................ | H04N 1/0035 358/474 |
| 2006/0215139 | A1 * | 9/2006 | Oshida ................. | G02B 26/12 355/55 |

(Continued)

FOREIGN PATENT DOCUMENTS

JP 62043274 * 2/1987

*Primary Examiner* — Ryan R Yang
(74) *Attorney, Agent, or Firm* — Sughrue Mion, PLLC

(57) ABSTRACT

A display apparatus is disclosed. The display apparatus includes: a transparent display, a scanner comprising a lens array and attached to the transparent display and a controller configured to control the scanner to scan an object viewed through the transparent display using the lens array being slid from a side of the transparent display to another side opposite to the side, and control the transparent display to display information in response to the scanning of the object.

13 Claims, 15 Drawing Sheets

(56) References Cited

U.S. PATENT DOCUMENTS

| | | | |
|---|---|---|---|
| 2008/0180772 A1* | 7/2008 | Miyatake | G02B 26/123 359/204.1 |
| 2009/0298547 A1* | 12/2009 | Kim | H04W 52/027 455/566 |
| 2010/0188428 A1* | 7/2010 | Shin | G06F 1/1639 345/661 |
| 2010/0245937 A1* | 9/2010 | Edwards | H04N 1/0318 358/474 |
| 2014/0071323 A1* | 3/2014 | Yi | G06F 3/04883 348/333.01 |
| 2014/0132530 A1* | 5/2014 | Suh | G06F 3/0412 345/173 |
| 2014/0172408 A1* | 6/2014 | Vukosavljevic | G06F 17/211 704/2 |

* cited by examiner

DISPLAY APPARATUS AND CONTROL METHOD THEREOF

CROSS-REFERENCE TO RELATED APPLICATION

This application claims priority from Korean Patent Application No. 10-2014-0076390, filed on Jun. 23, 2014, in the Korean Intellectual Property Office, the disclosure of which is incorporated herein by reference in its entirety.

BACKGROUND

1. Field

Apparatuses and methods consistent with the exemplary embodiments disclosed herein relate to a display apparatus and a controlling method thereof, and more specifically, to a display apparatus including a transparent display and a controlling method thereof.

2. Description of the Related Art

Development of electronic technologies has enabled introduction of various types of display apparatus. Particularly, recent researches regarding next-generation display apparatuses such as a transparent display apparatus have been increasingly discussed.

A "transparent display apparatus" refers to an apparatus having a transparent property that enables one to see things behind the transparent display apparatus. In related art, non-transparent semiconductor compounds such as Si or GaAs are used in manufacturing a display panel. However, efforts for developing a new type of electronic component have been made. One of the results from these efforts is a transparent display apparatus.

A transparent display apparatus is implemented by including transparent oxide semiconductor layers which provide a transparent property. Thus, if a transparent display apparatus is used, a user can view both the screen provided from a transparent display apparatus and real objects placed at the back of the apparatus. Therefore, the present inventive concept may overcome spatial and time limitations of the related-art display apparatuses, and there is a need to utilize these apparatuses.

SUMMARY

Exemplary embodiments of the present inventive concept may overcome the above disadvantages and other disadvantages not described above. Also, the present inventive concept is not required to overcome the disadvantages described above, and the exemplary embodiments of the present inventive concept may not overcome any of the problems described above.

The exemplary embodiments provide a display apparatus which may use a transparent display for various uses and a controlling method thereof.

According to an aspect of an exemplary embodiment, there is provided a display apparatus which may include: a transparent display; a scanner comprising a lens array and attached to the transparent display; and a controller configured to control the scanner to scan an object viewed through the transparent display using the lens array being slid from a side of the transparent display to another side opposite to the side, and control the transparent display to display information in response to the scanning of the object. Here, the displayed information may be related to the scanned object.

The controller may be further configured to control the lens array to scan the objet viewed through the transparent display.

The scanner may include the lens array which comprises a plurality of lens and corresponds to a side of the transparent display, and the controller may be further configured to control the lens array to move the lens array with respect to the transparent display and scan the object viewed through the transparent display.

The scanner may include: a body in which the lens array is disposed; a support which supports the body, while scanning, such that the lens array disposed on the body is slid with a preset interval from the transparent display; and a rail on which the support is slidably formed on both sides of the transparent display.

The scanner may further include at least one illuminating light source around the at least one lens.

The scanner may further include a cylindrical lens provided on a side of the at least one lens.

The controller may be further configured to adjust transparency of an area in the transparent display where the information is displayed.

The controller, in response to a foreign language text being included in a result of the scanning the object, may be further configured to control the transparent display to display translation of the foreign language text as the information.

The controller may be configured to control the transparent display to display a graphical user interface (GUI) to control the scanner on the transparent display.

The controller may be further configured to scan the object in response to sensing a contact of the object with the transparent display.

The controller may be further configured to change a direction that the lens array is facing to scan the object.

The controller may be configured to display the information at a predetermined area in the transparent display. The predetermined area may be an area where the object is not positioned in the transparent display.

According to an aspect of another exemplary embodiment, there is provided a display apparatus which may include: a display; at least one lens in communication with the display; and a controller configured to control the at least one lens to capture an image of an object and provide information on the display in response to the capturing of the image of the object, wherein the information comprises information about the object.

The display may include a transparent display, and the controller may be configured to control the at least one lens to capture an image disposed behind the transparent display and control the display to display the information on the transparent display in response to the capturing the image of the object.

The controller may be further configured to recognize a characteristics of the object in response to the capturing the image of the object.

According to an aspect of still another exemplary embodiment, there is provided a method of controlling of a display apparatus which includes a transparent display and a scanner including at least one lens. The method may include: scanning, in response to the at least one lens being moved, an object which is viewed through the transparent display; and providing information in response to the scanning the object.

Here, the information may be related to the object.

Therefore, according to the various exemplary embodiments, a display apparatus may be used for various purposes, thereby improving user convenience.

BRIEF DESCRIPTION OF THE DRAWINGS

The above and/or other aspects of the exemplary embodiment will be more apparent with reference to the accompanying drawings, in which.

DETAILED DESCRIPTION OF THE EXEMPLARY EMBODIMENTS

Figure 1:
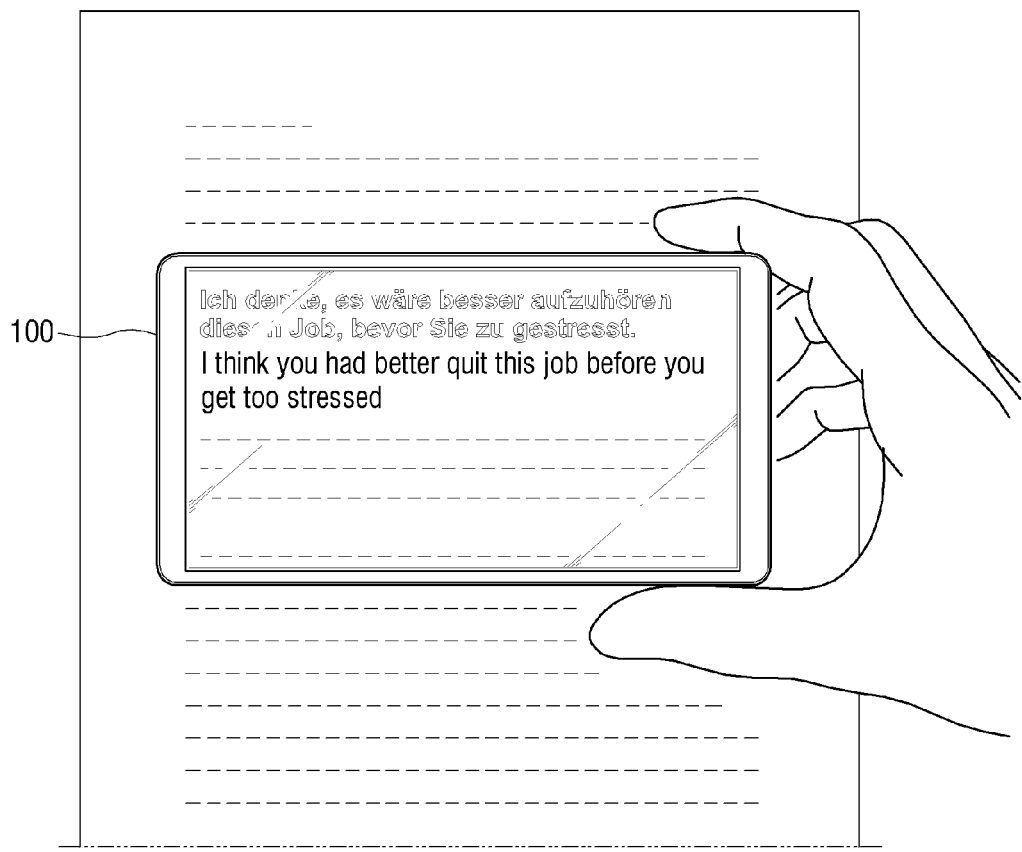
FIG. 1 is a view provided to explain an example of implementation of a display apparatus according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the exemplary embodiments with unnecessary detail.

FIG. 1 is a view provided to explain an example of implementation of a display apparatus according to an exemplary embodiment.

A display apparatus 100 shown in FIG. 1 may be a portable terminal, and may be implemented as a mobile phone, portable media player (PMP), personal digital assistant (PDA), notebook computer, or the like.

In particular, the display apparatus 100 may be implemented such that a display screen is embodied to be transparent, and a rear background is viewed transparently, according to an exemplary embodiment. However, the display apparatus 100 may not necessarily be a transparent display according to another exemplary embodiment.

For example, as illustrated in FIG. 1, the display apparatus 100 may display information while an object located in a rear side can be viewed transparently. In this case, information to be displayed may be information related to an object which is positioned in a rear side.

To be specific, the display apparatus 100 may scan an object which is positioned in a rear side, and provide an augmented reality (AR) function which provides information related to the object positioned in a rear side. Hereinbelow, the present inventive concept will be described in further detail with reference to the drawings.

Figure 2A:
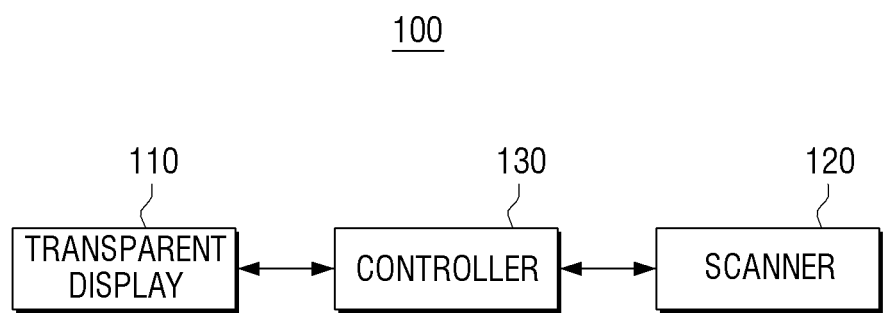
FIG. 2A is a block diagram illustrating a configuration of a display apparatus according to an exemplary embodiment.

FIG. 2A is a block diagram illustrating a configuration of a display apparatus according to an exemplary embodiment. According to FIG. 2A, the display apparatus 100 includes a transparent display 110, a scanner 120, and a controller 130.

The transparent display 110 displays information. Here, the information may include an image, a text, a contents playback screen, an application execution screen, a web browser screen, and various graphic objects.

The transparent display 110 may be implemented as various types such as a liquid crystal display (LCD) type, transparent thin-film electroluminescent panel (TFEL) type, transparent organic light-emitting diode (OLED) type, or penetrating type. In the following, structure of the transparent display 110 according to various embodiments will be explained.

The "transparent LCD type" as used herein indicates a transparent display apparatus in which backlight units are omitted from a currently-used LCD apparatus, with a pair of polarized substrates, optical films, transparent thin film transistors, or transparent electrodes used. The transparent LCD apparatuses may have a lower transmittance compared to polarized substrates or optical films, and lower light efficiency because ambient lights are used instead of backlight units. However, it may have an advantage in implementing a wide-facing transparent display. The "transparent TFEL type" as used herein indicates an apparatus using transparent electrodes, inorganic fluorescent materials, and alternating inorganic thin film electroluminescent display (AC-TFEL) formed of insulating films. The AC-TFEL is a display in which accelerated electrons pass through interior of inorganic fluorescent materials to excite fluorescent materials, thus generating lights. If the transparent display 130 is implemented as a transparent TFEL type, the controller 130 may adjust such that electrons are transmitted toward proper places, and determine a position of placing information. Because inorganic fluorescent objects and insulating films have transparency, high transparent display may be implemented.

Additionally, the "transparent OLED type" indicates a transparent display apparatus using ab OLED which is self-illuminating. Because an organic light-emitting layer is transparent, if both electrodes are used as transparent electrodes, a transparent display apparatus may be implemented. The OLED may generate lights by injecting electrons and holes from both sides of an organic light-emitting layer, according to which the electrons and holes are coupled to generate light within the organic light-emitting layer. A transparent OLED apparatus may use the above principle, inject electrons and holes toward the determined positions and display information.

Figure 3:
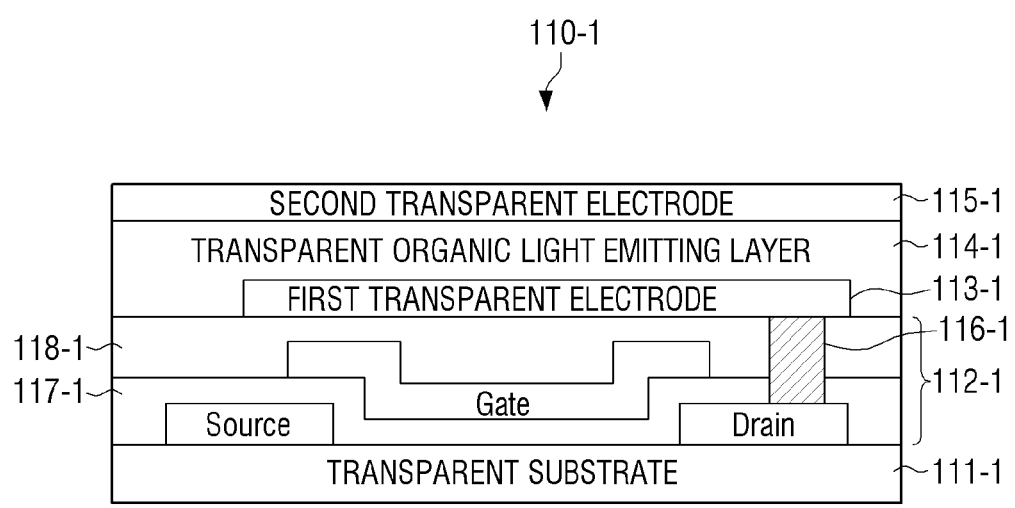
FIG. 3 is a view illustrating a detailed configuration of a transparent display which is implemented as a transparent organic light-emitting diode (OLED).

FIG. 3 illustrates a detailed configuration of a transparent display implemented as a transparent OLED type. For convenient explanation, 110-1 indicates a transparent display implemented as transparent OLED type.

Referring to FIG. 3, the transparent display 110-1 may include a transparent substrate 111-1, a transparent transistor layer 112-1, a first transparent electrode 113-1, a transparent organic light-emitting layer 114-1, a second transparent electrode 115-1, and a connecting electrode 116-1.

The transparent substrate 111-1 may use polymer materials having transparent properties such as plastic or glasses. Material of the transparent substrate 111-1 may be determined according to use environment in which the transparent display apparatus 100 is used. For instance, because polymer materials have advantages in being light-weighted and flexible, it may be utilized in mobile display apparatuses. Glasses may be used in show windows of shops or other windows.

The transparent transistor layer 112-1 indicates a layer including a transistor manufactured by substituting non-transparent silicon with transparent materials such as zinc oxide or titanium oxide. Within the transparent transistor layer 112-1, a source, a gate, a drain and several types of conductive films 117-1, 118-1 may be formed, and further, the connecting electrode 116-1 electrically connecting the drain and the first transparent electrode 113-1 may also be formed. Although FIG. 3 illustrates one transparent transistor formed of a source, a gate and a drain, in actual implementation, there may be a plurality of transparent transistors regularly distributed on a whole area of a display surface may also be installed for implementation. The controller 130 may allow controlling signals to be applied to the gates of the respective transistors within the transparent transistor layer 112-1, and drive a corresponding transparent transistor to display information.

The first transparent electrode 113-1 and the second transparent electrode 115-1 may be placed on opposite sides of the transparent organic light-emitting layer 114-1. The first transparent electrode, the transparent organic light-emitting layer and the second transparent electrode 113-1, 114-1, 115-1 may constitute a transparent OLED.

The transparent OLED may be largely classified into a passive matrix OLED (PMOLED) and an active matrix OLED (AMOLED). The PMOLED is a structure wherein crossing parts of the first transparent electrode 113-1 and the second transparent electrode 115-1 form pixels. Meanwhile, the AMOLED is a structure wherein thin film transistors (TFT) driving each of pixels are placed. FIG. 3 illustrates the AMOLED.

The first transparent electrode 113-1 and the second transparent electrode 115-2 may have a plurality of line electrodes, and arranging directions of the line electrodes may be formed orthogonally to each other. For instance, if line electrodes of the first transparent electrode 113-1 are arranged horizontally, line electrodes of the second transparent electrodes 115-1 may be arranged vertically. Thus, between the first transparent electrode 113-1 and the second transparent electrode 115-1, a plurality of crossing areas may be formed. Referring to FIG. 3, in each crossing area, a transparent transistor may be connected.

The controller 130 may use a transparent transistor to generate a potential difference in each crossing area. Within crossing areas wherein the potential difference is formed, electrons and holes from each electrode are injected to an organic light-emitting layer 114-1 and combined to emit light. Meanwhile, in crossing areas where the potential difference is not formed, light-emitting may not be implemented, and things at the back may be seen transparently.

The first transparent electrode 113-1 and the second transparent electrode 115-1 may use indium tin oxide (ITO). Alternatively, new materials such as graphene may be used. The graphene is a material having transparency wherein carbon atoms are connected to each other and show a beehive-shaped planar structure. Besides, the transparent organic light-emitting layer 114-1 may be implemented with various materials.

Meanwhile, as described above, the transparent display 110 may be implemented as a penetrating type as well as an LCD type, TFEL type, and transparent OLED type. The penetrating type employs a method of projecting and displaying an image on a transparent screen such as a head up display (HUD).

Referring to FIG. 2A again, the scanner 120 photographs an object positioned in a rear side of the transparent display 110, and generates scan information.

To be specific, the scanner 120 may be disposed on a side of the transparent display 110, and include a lens array (or a camera array) having a length corresponding to a side of the transparent display 110. However, in some cases, the scanner 120 may include a general mobile camera.

In particular, the scanner 120 may include a body in which the lens array is disposed, a support which supports the body, while scanning, so that the lens array disposed on the body is slid with a preset interval from the transparent display, and a rail on which the support is slidably formed on both sides of the transparent display 110.

In this case, the lens array may include at least one of a short focus lens and a long focus lens. For example, the lens array may be configured such that the short focus lens and a long focus lens are alternately disposed.

In addition, the scanner 120 may further include at least one illuminating light source (for example, LED) which is disposed between the lens elements constituting the lens array, or a cylindrical lens which is disposed at a side of the lens array and provides external light to the transparent display. But, this embodiment is merely exemplary, and light which illuminates light to an object to be scanned may be implemented in various forms such as a light array where a plurality of illuminating elements are disposed.

Further, the scanner 120 is configured to adjust a direction at which the lens array is directed, and when it is necessary, the scanner may be configured to perform the same function as a general phone camera.

The detailed implementation format of the scanner 120 will be further described with reference to the drawings.

The controller 130 controls overall operations of the display apparatus 100.

To be specific, the controller 130, when the lens array is slid to another side which is opposite to a side of the transparent display 110 according to a set event, and an image which is viewed through the transparent display 110 is scanned, may provide an augmented reality (AR) function to display on the transparent display corresponding additional information based on the scanned image.

Here, a preset event may be an event to enter a scan mode to scan an object which is in contact with the transparent display. For example, a user places the display apparatus 100 in contact with documents to use the display apparatus 100 for scanning. In this case, the event may be sensed using a proximity sensor, a contact sensor, or the like. However, in some cases, inputting a specific button to enter the scan mode, a voice command, and a motion command may be used to detect the event. Or, for scanning, a user's manual operation to move the scanner 120 may be the preset event.

Additional information on an object may be provided in various formats such as a map, site address, relevant image, relevant text, advertisement contents, according to a type of an object included in a scanned image. For example, the controller 130, when a foreign language text is included in a scanned image, may provide translation of the foreign language text as additional information.

The controller 130 may reduce transparency of an area where additional information is displayed and control such that recognizability of additional information increases on the transparent display 110. For example, the controller 130 may switch polarized light elements of an area where additional information is displayed to increase the display features, but this is merely exemplary, and various methods to increase the display features by reducing transparency may be used.

Further, the controller 130 may control to display on the transparent display 110 a graphic user interface (GUI) to indicate a scanning position (or scanning speed) of the scanner 120. Accordingly, when a user manually manipulates movement of the scanner 120, a difference between movement speed of the lens array and real scanning speed may be recognized by a user.

Figure 2B:
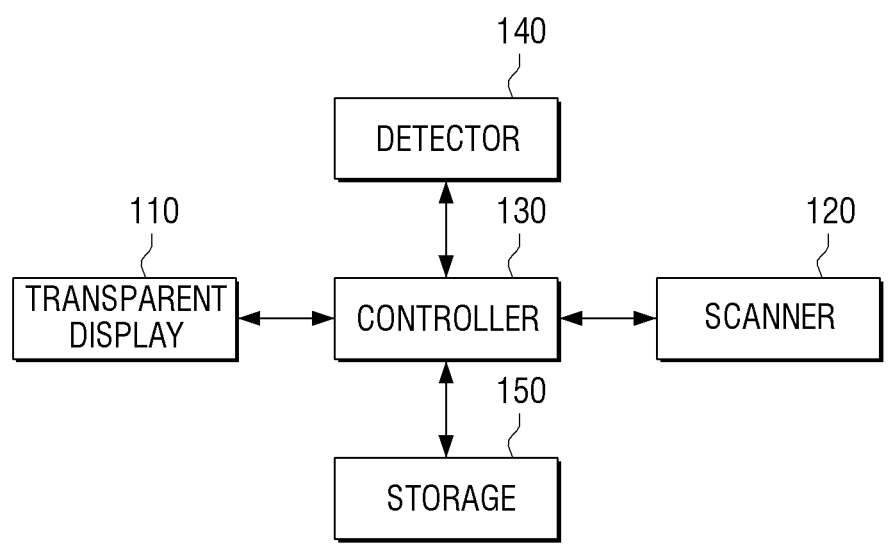
FIG. 2B is a block diagram illustrating a configuration of a display apparatus according to another exemplary embodiment.

FIG. 2B is a block diagram illustrating a configuration of the display apparatus according to another exemplary embodiment. According to FIG. 2B, the display apparatus 100 includes the transparent display 110, the scanner 120, the controller 130, the detector 140, and the storage 150.

From among the elements illustrated in FIG. 2B, the elements which overlap with the elements illustrated in FIG. 2A will not be explained further.

The detector 140 senses information on illumination intensity and background information around the transparent display 110. Here, the background information around the transparent display 110 may include information on an object which is positioned at a specific direction from the transparent display 110. Accordingly, the detector (not illustrated) may be implemented as an illumination intensity sensor and an imaging sensor enabling depth sensing. Here, the illumination intensity sensor may use several photoelectric cells, but when measuring an extremely low illumination intensity, it is possible to use a photoelectric tube.

In this case, the controller 130, based on information sensed by the detector 140, may control an on/off state of an illuminating element provided on the scanner 120 and an operation state of the short focus lens and long focus lens, or the like. For example, the controller 130, when sensed illumination intensity information has a value which is higher than a preset value, may control the illuminating element to be turned off.

Or, the controller 130, based on the illumination intensity information sensed by the detector 140, may adjust at least one of the illumination intensity value or a color value of a pixel area which corresponds to information displayed on the transparent display 110. For example, the controller 130, when luminance of both front and rear of the transparent display 100 is high, and recognizability of displayed information is weak, may reduce the display illumination intensity of the pixel area which corresponds to the information such that displayed information may be recognized more clearly.

In addition, the controller 130, based on background information which is sensed by the detector 140, may change a position of information displayed on the transparent display 110. For example, when information is displayed while an object which is positioned at a rear of the transparent display 100 is viewed transparently, based on the position where the object is viewed to a user, a shape and a color of the object, display state of information may be changed and displayed. Here, an object is present with a concrete shape, and may be various things such as a product available to sale, animals/plants, furniture, wall, and wallpaper.

For example, the detector 140 may capture a rear background image using an imaging element such as a camera, analyze the captured rear background image, and recognize attributes included in the image for example, color or texts of the object and image drawn or attached to the object. In case of color of the object, an edge may be detected from the captured image, and a color of the detected edge may be recognized or determined. The text or image may be recognized by using a text reading or image reading algorithm from the captured image. When this color, text, or image is detected or recognized, the detector 140 may provide the controller 130 the information on the object.

In addition, the detector 140 may detect an average color of the rear background through the captured image. For example, the detector 140, when there are various colors which are viewed on the transparent display 110, may detect an average value of the various colors.

The controller 130, based on the shape and color of the rear background detected by the detector 140, the shape and color of the object included in the rear background, may adjust color of information, illumination intensity, and a size which are displayed on the transparent display 110.

In the storage 150, an image scanned by the scanner 120, information on a position of the object, other diverse information, various setting information which a user sets related to the operations of the display apparatus 100, system operating software, and various application programs may be stored.

A user interface (not illustrated) is a part to receive a user command related to the operations of the display apparatus 100. The user interface may be implemented in various forms such as an input/output interface which receives various input signals from various external input means, e.g., a touch screen which is implemented on the display 110, various buttons provided on the main body of the display apparatus 100, a keyboard connected to the display apparatus 100, and mouse. Through the user interface, a user may turn on/off the scanning function, position movement function, and may set conditions to move information display position or a method to change display attributes for movements.

FIGS. 4A-4C, 5A, and 5B are views to explain examples of implementation of a display apparatus according to an exemplary embodiment.

Figure 4A:
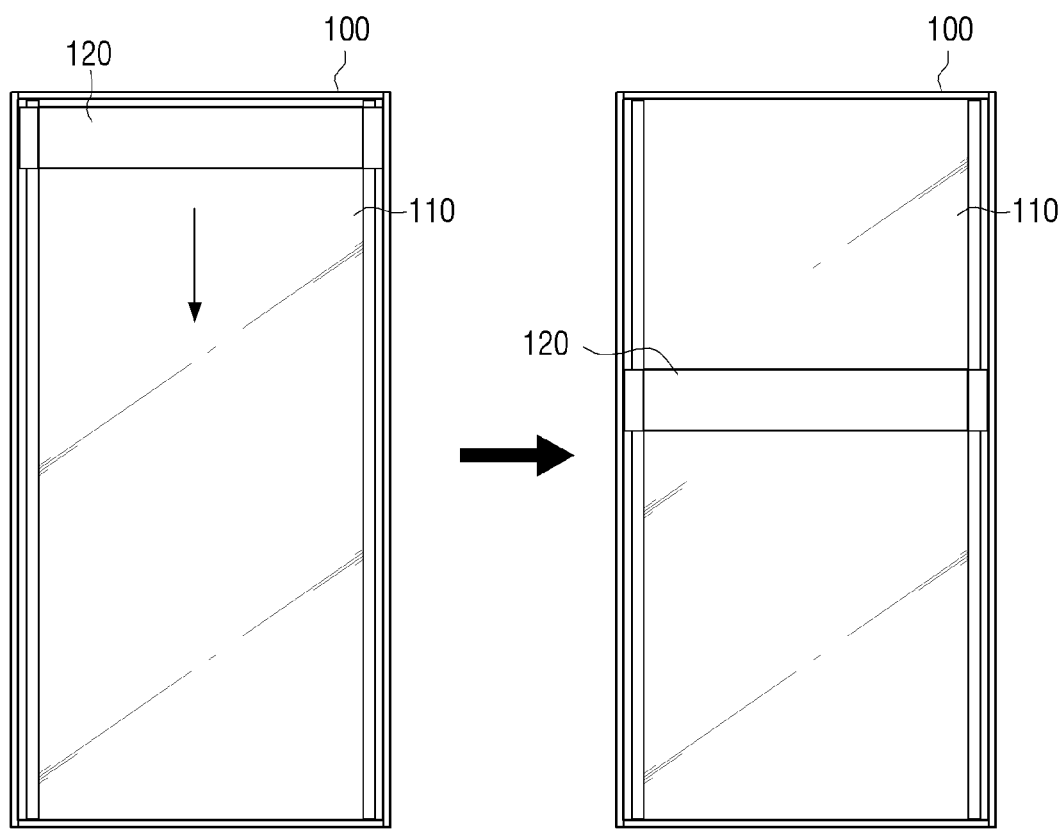
FIGS. 4A-4C, 5A, and 5B are views to explain example implementation of a display apparatus according to exemplary embodiments.
Figure 4B:
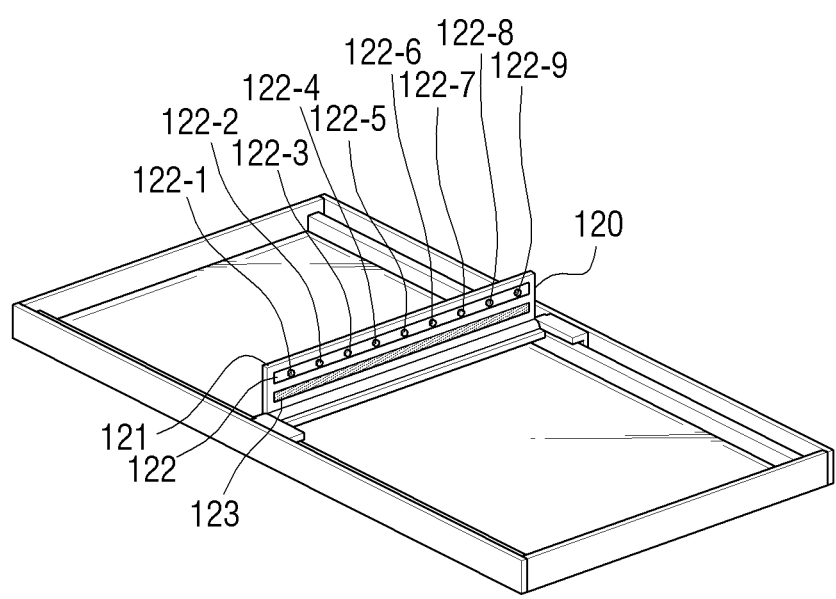
Figure 4C:
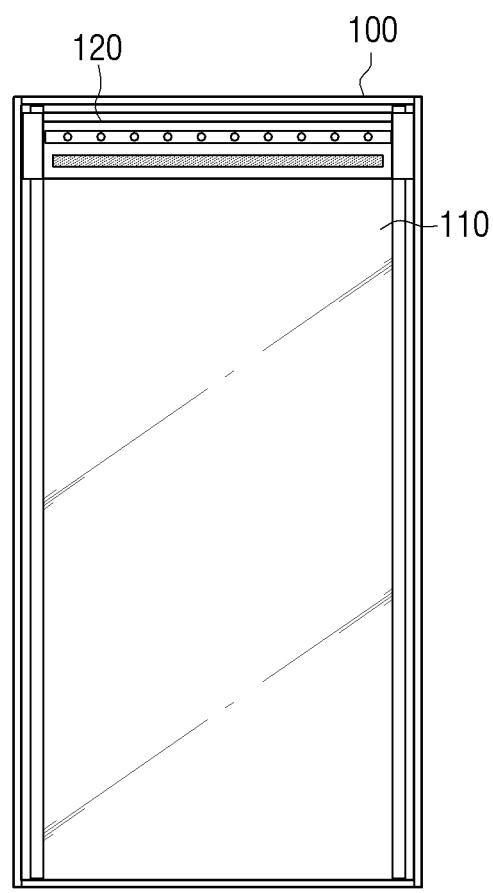

As illustrated in FIGS. 4A to 4C, the display apparatus 100 may be implemented to include the transparent display 110 and the scanner 120 which performs scanning of an image which is viewed through the transparent display 110.

As illustrated in FIG. 4A, the scanner 120 may slidably move from a side of the transparent display 110 to an opposite side manually or automatically, and generate a scanned image by scanning an image viewed through the transparent display 110.

FIG. 4B is a view provided to explain a detailed configuration of the scanner 120, and the scanner 120 may include a lens array 122, a lighting unit 123, and a support 121 to support them.

Here, the lens array 122 may be implemented to include a plurality of lens 122-1 to 122-9. The lens array 122 may include at least one of the short focus lens or the long focus lens. However, the lens array 122 may be configured to include only one lens according to another exemplary embodiment.

Figure 5A:
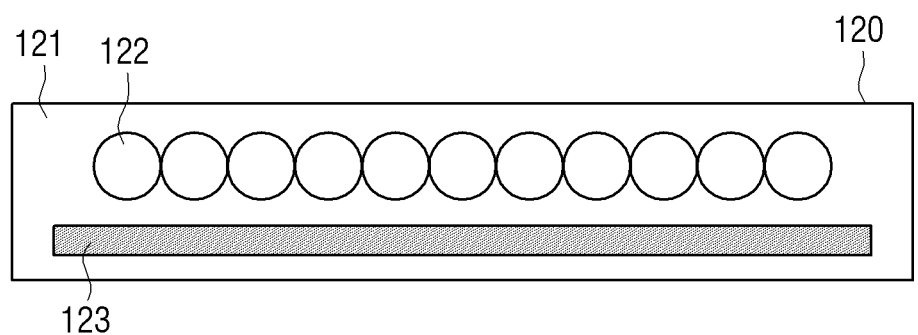

FIG. 5A is a view illustrating a configuration of the scanner 120 according to an exemplary embodiment. As illustrated in FIG. 5A, the scanner 120 may include the lens array 122 where a plurality of lenses are disposed and a lighting unit 123 which is provided on a side of the lens array and is implemented as a cylindrical lens which provide external light to the transparent display 110.

Figure 5B:
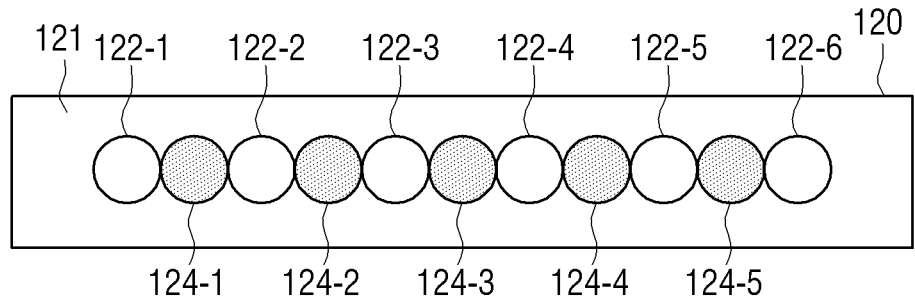

FIG. 5B is a view illustrating a configuration of the scanner 120 according to another exemplary embodiment. As illustrated in FIG. 5B, the scanner 120 may be implemented to include at least one illuminating light source 124-1 to 124-5 which is positioned between the lens elements 122-1 to 122-6 constituting the lens array.

In addition, the scanner 120 may be implemented such that angle adjustment (or rotation) from the transparent display 110 is available. For example, as illustrated in FIG. 4C, the scanner 120 may be folded in an opposite direction and perform a photographing function. For example, the scanner 120 may be implemented to capture an image at a direction where the lens array faces, and provide the AR function through the corresponding image. For another example, the scanner may be configured to change an optical axis of at least one lens of the lens array.

FIGS. 6A, 6B, 7A, and 7B are views provided to explain examples of implementing a display apparatus according to exemplary embodiments.

Figure 6A:
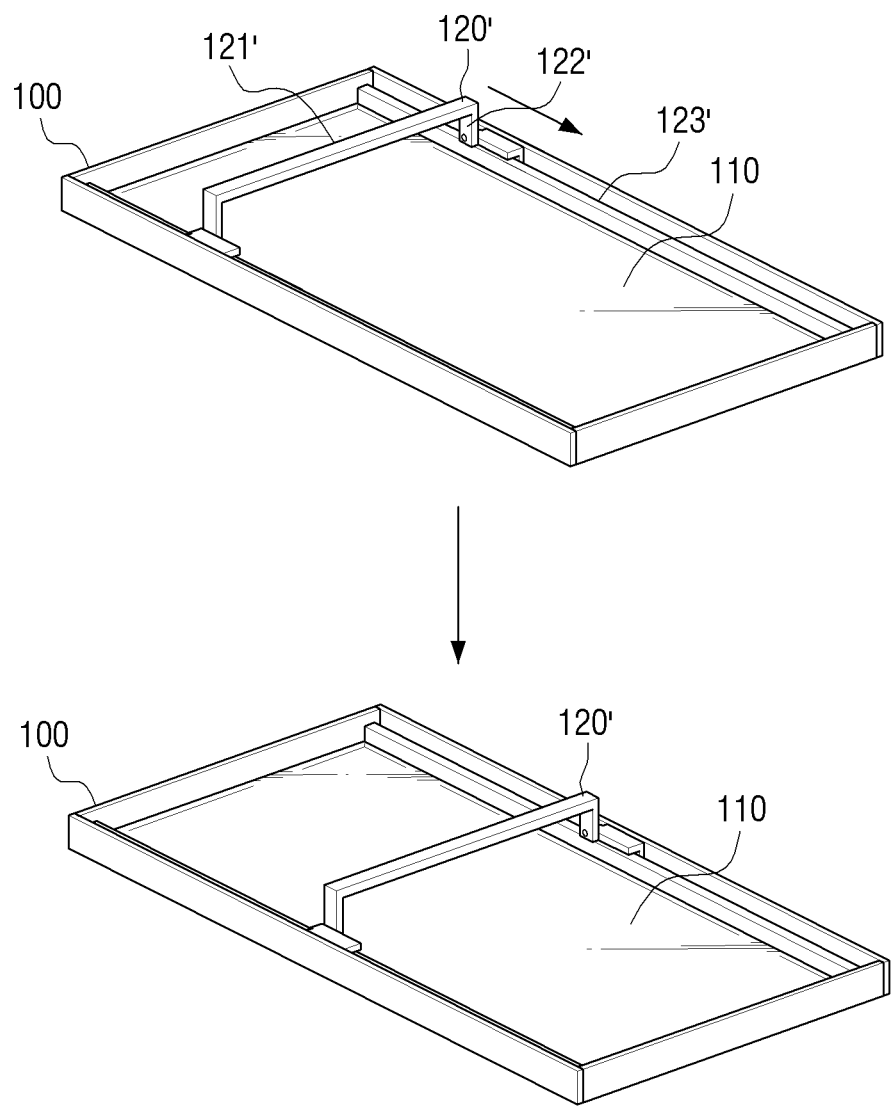
FIGS. 6A, 6B, 7A, and 7B are views provided to explain example implementing a display apparatus according to other exemplary embodiments.
Figure 6B:
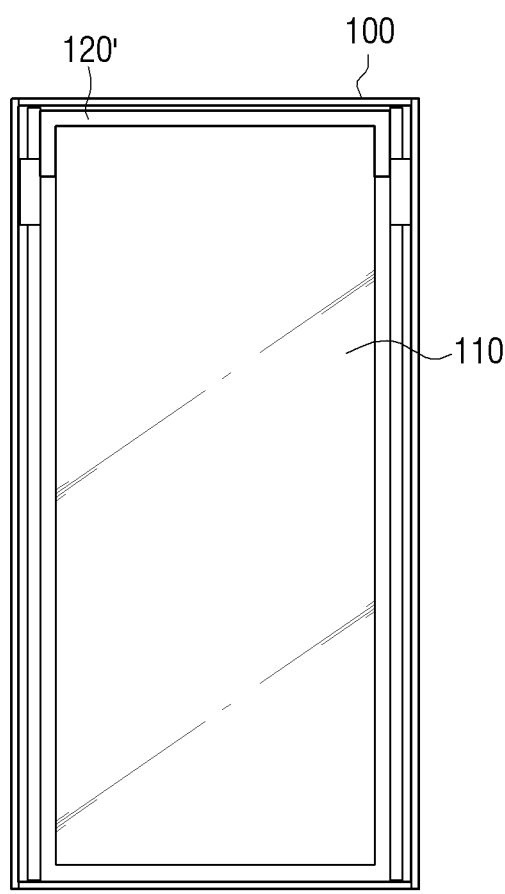

As illustrated in FIGS. 6A and 6B, the display apparatus 100 may include the transparent display 110 and the scanner 120' which is placed apart from the transparent display 110 and scans an image which is viewed through the transparent display 110. In this case, the scanner 120', through a simple structure of a device using a hinge and a joint, may secure distance between an object and a camera which is necessary for a scanning operation, that is, photographing by a camera.

As illustrated in FIG. 6A, the scanner 120' which is formed to be apart from the display 110 may slidably move from a side of the transparent display 110 to an opposite side automatically or manually, and generate a scan image by scanning an image which is viewed through the transparent display 110.

To be specific, the scanner 120' may include a body 121' where the lens array is disposed, a support 122', while scanning, which supports the body 121' so that the lens array disposed on the body 121' is disposed from the transparent display 110 with a preset interval and slidably moves, and a rail 123' which is formed on both sides of the transparent display 110 so that the support 122' may slide.

Figure 7A:
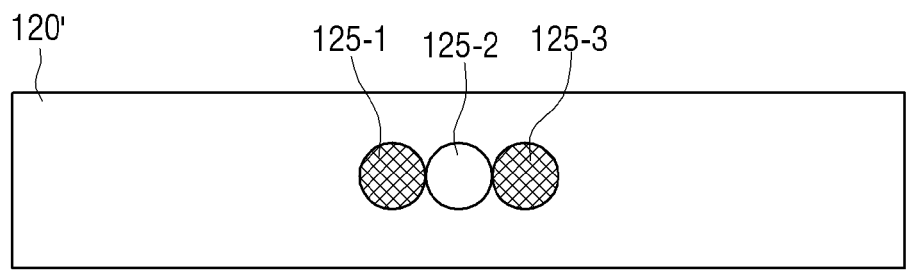

FIG. 7A is a view illustrating a configuration of the scanner 120' according to an exemplary embodiment. As illustrated in FIG. 7A, the scanner 120' may include lens array in which depth sensors 125-1, 125-3 and a lens 125-2 are disposed. Here, the depth sensors 125-1, 125-3 may include an infrared (IR) light emitting sensor and an IR light receiving sensor to detect a depth of an object, but it is not limited to this embodiment, and a different sensor which enables detecting a depth may be included.

Figure 7B:
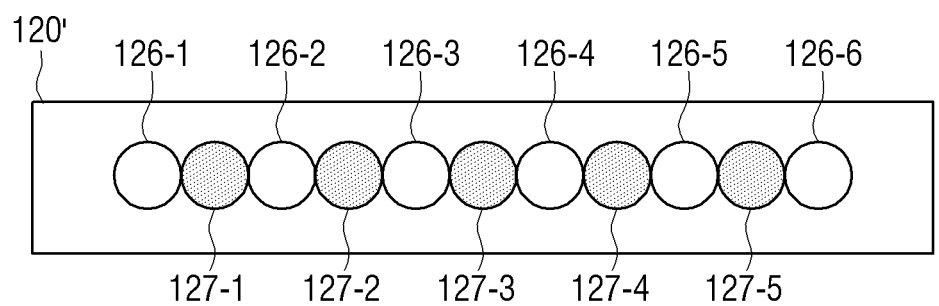

FIG. 7B is a view illustrating a configuration of the scanner 120' according to another exemplary embodiment. As illustrated in FIG. 7B, the scanner 120 may include lens array in which different types of lenses are cross arrayed. For example, the lens array may have a structure that the short focus lenses 126-1 to 126-6 and long focus lenses 127-1 to 127-5 are cross arrayed, but is not limited thereto.

Here, the lens array 122 may include a plurality of lenses 122-1 to 122-9. The lens array 122 may include at least one of the short focus lens and the long focus lens.

Further, the scanner 120' may be embodied to be folded and hung at a side of the display apparatus 100. For example, as illustrated in FIG. 6B, the scanner 120', when it is not used, may be folded and hung at a corner of the display apparatus 100.

Figure 8:
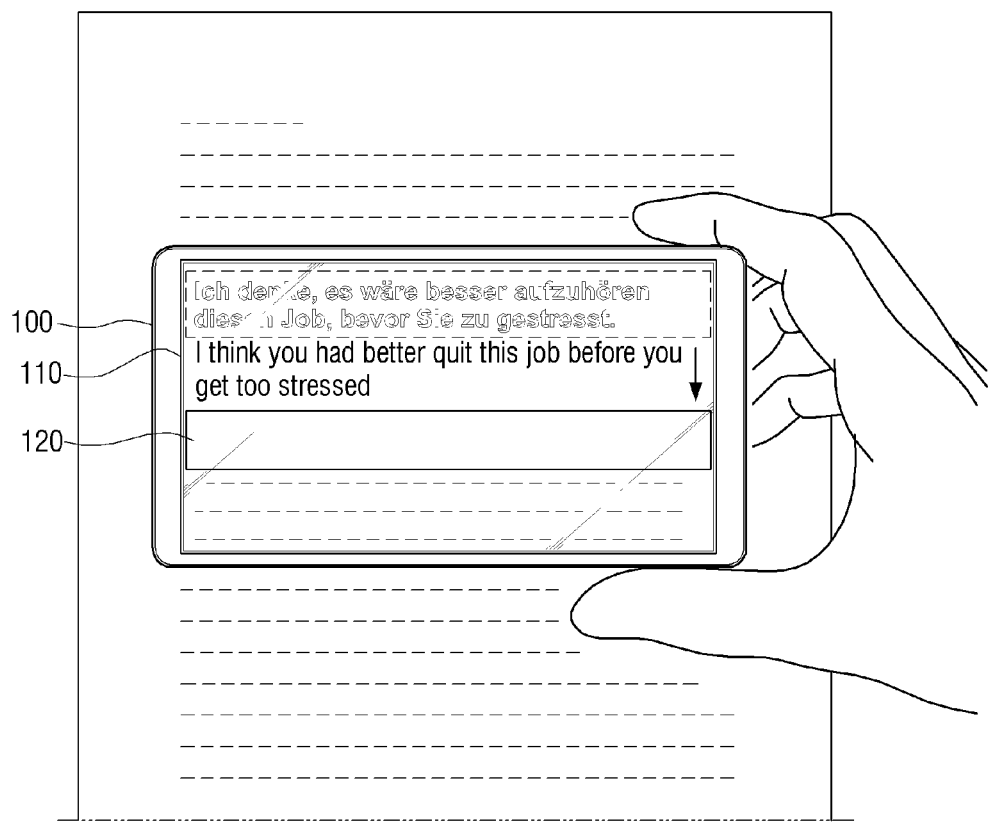
FIG. 8 is a view provided to explain operations of a display apparatus according to an exemplary embodiment.

FIG. 8 is a view provided to explain operations of a display apparatus according to an exemplary embodiment.

As illustrated in FIG. 8, when the display apparatus 100 is in contact with an object, a scan mode may be entered to automatically according to a user command, and the scanner 120 may scan an image which is viewed through the transparent display 110. Here, based on the image scanned on the transparent display 110, information related to the object may be provided.

For example, when an object which is viewed through the transparent display 110 includes a foreign text, translation on the foreign text may be displayed as additional information. In this case, the translation may be provided on a blank area in which the foreign text is not viewed.

Figure 9:
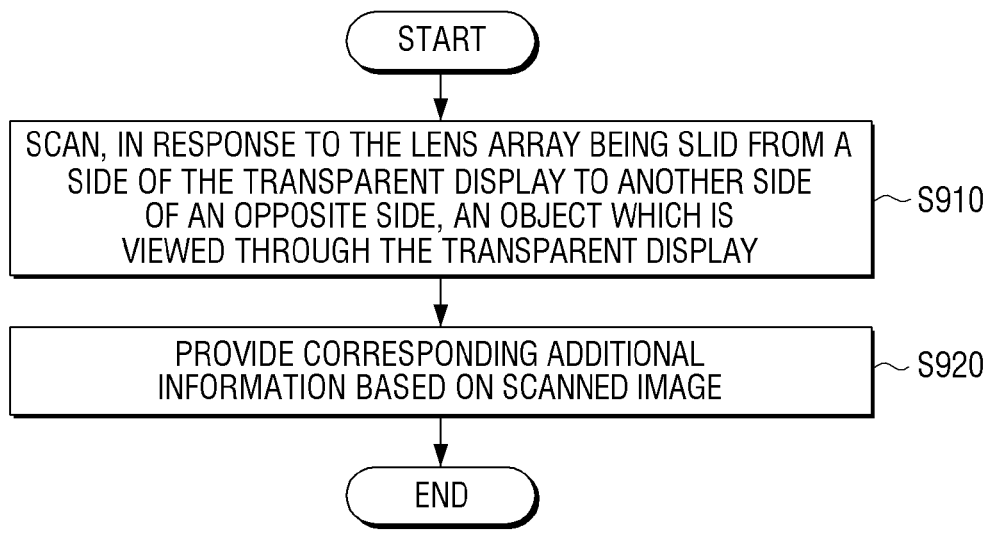
FIG. 9 is a view provided to explain a method for controlling a display apparatus according to an exemplary embodiment.

FIG. 9 is a view provided to explain a method for controlling a display apparatus according to an exemplary embodiment.

As illustrated in FIG. 9, according to a method for controlling of a display apparatus which includes a transparent display and a scanner which includes the lens array having a length which corresponds to a side of the transparent display, first of all, the lens array is slid from a side of the transparent display to an opposite side according to a preset event and scans an object which is viewed through the transparent display (S910).

Then, based on the scanned image, corresponding information is provided (S920).

In this case the providing additional information (S920) may reduce transparency of an area where additional information is displayed so that recognizability of additional information increases on the transparent display.

In addition, at S920 to provide additional information, when a foreign text is included in a scanned image, translation of foreign text may be provided as additional information.

As described above, according to various exemplary embodiments, the display apparatus which includes the transparent display may be used for various purposes, increasing user satisfaction.

The foregoing exemplary embodiments and advantages are merely exemplary and are not to be construed as limiting the inventive concept. The inventive concept can be readily applied to other types of apparatuses. Also, the description of the exemplary embodiments of the inventive concept is intended to be illustrative, and not to limit the scope of the claims.

What is claimed is:
1. A display apparatus comprising:
a transparent display;
a scanner comprising a lens array and attached to the transparent display, the lens array comprising a plurality of lenses and corresponding to a side of the transparent display; and
a controller configured to control the scanner to scan an object viewed through the transparent display using the lens array being slid from a side of the transparent display to another side opposite to the side, and control the transparent display to display information in response to the scanning of the object,
wherein the scanner further comprises:
a body in which the lens array is disposed;
a support which supports the body, while scanning, such that the lens array disposed on the body is slid with a preset interval from the transparent display; and
a rail on which the support is slidably formed on both sides of the transparent display.
2. The display apparatus of claim 1, wherein the displayed information is related to the scanned object.
3. The display apparatus of claim 1, wherein the controller is further configured to control to the lens array to scan the objet viewed through the transparent display.

4. The apparatus of claim 1, wherein the lens array comprises at least one of a short focus lens and a long focus lens.

5. The apparatus of claim 1, wherein the scanner further comprises at least one illuminating light source around the at least one lens.

6. The apparatus of claim 1, wherein the scanner further comprises a cylindrical lens provided on a side of the at least one lens.

7. The apparatus of claim 1, wherein the controller is further configured to adjust transparency of an area in the transparent display where the information is displayed.

8. The apparatus of claim 1, wherein the controller, in response to a foreign language text being included in a result of the scanning of the object, is configured to control the transparent display to display translation of the foreign language text as the information.

9. The apparatus of claim 1, wherein the controller is configured to control the transparent display to display a graphical user interface (GUI) to control the scanner on the transparent display.

10. The apparatus of claim 1, wherein the controller is further configured to scan the object in response to sensing a contact of the object with the transparent display.

11. The apparatus of claim 1, wherein the controller is further configured to change a direction that the lens array is facing to scan the object.

12. The apparatus of claim 1, wherein the controller is configured to display the information at a predetermined area in the transparent display.

13. The apparatus of claim 12, wherein the predetermined area is an area where the object is not positioned in the transparent display.

* * * * *